(12) United States Patent
Chen et al.

(10) Patent No.: US 10,068,711 B2
(45) Date of Patent: Sep. 4, 2018

(54) SOLID ELECTROLYTIC CAPACITOR PACKAGE STRUCTURE FOR INCREASING ELECTRICAL PERFORMANCES AND METHOD OF MANUFACTURING THE SAME, AND CAPACITOR UNIT THEREOF

(71) Applicant: APAQ TECHNOLOGY CO., LTD., Miaoli County (TW)

(72) Inventors: Ming-Tsung Chen, Changhua County (TW); Chieh Lin, Hsinchu County (TW)

(73) Assignee: APAQ TECHNOLOGY CO., LTD., Miaoli County (TW)

( * ) Notice: Subject to any disclaimer, the term of this patent is extended or adjusted under 35 U.S.C. 154(b) by 0 days.

(21) Appl. No.: 15/602,183

(22) Filed: May 23, 2017

(65) Prior Publication Data
US 2017/0352491 A1 Dec. 7, 2017

(30) Foreign Application Priority Data
Jun. 6, 2016 (TW) .............................. 105117853 A

(51) Int. Cl.
| | | |
|---|---|---|
| *H01G 9/00* | (2006.01) | |
| *H01G 9/08* | (2006.01) | |
| *H01G 9/26* | (2006.01) | |
| *H01G 9/012* | (2006.01) | |
| *H01G 9/025* | (2006.01) | |

(52) U.S. Cl.
CPC ............. *H01G 9/08* (2013.01); *H01G 9/0029* (2013.01); *H01G 9/012* (2013.01); *H01G 9/025* (2013.01); *H01G 9/26* (2013.01)

(58) Field of Classification Search
CPC ........ H01G 9/08; H01G 9/0029; H01G 9/021; H01G 9/025; H01G 9/26; H01G 9/00; H01G 9/004
USPC ........ 361/535, 500, 502, 517, 522, 523, 541
See application file for complete search history.

(56) References Cited

U.S. PATENT DOCUMENTS

| | | | |
|---|---|---|---|
| 7,016,179 B2* | 3/2006 | Ando | H01G 9/012 361/523 |
| 7,359,181 B2* | 4/2008 | Kuriyama | H01G 9/012 361/538 |
| 7,898,795 B2* | 3/2011 | Kasuga | H01G 9/012 361/516 |
| 8,116,068 B2* | 2/2012 | Nishimura | H01G 9/0032 361/516 |

(Continued)

*Primary Examiner* — Angel R Estrada
(74) *Attorney, Agent, or Firm* — Li & Cai Intellectual Property (USA) Office

(57) ABSTRACT

The present disclosure provides a solid electrolytic capacitor package structure for increasing electrical performances and a method of manufacturing the same, and a capacitor unit thereof. The capacitor unit includes at least one first capacitor, the at least one first capacitor includes a conductive polymer composite material layer. The conductive polymer composite material layer includes a conductive polymer material and a first nanometer material mixed with the conductive polymer material, and the first nanometer material includes a plurality of first fully embedded nanometer structures completely enclosed by the conductive polymer material and a plurality of first partially exposed nanometer structures partially exposed from the conductive polymer material.

12 Claims, 12 Drawing Sheets

(56) References Cited

U.S. PATENT DOCUMENTS

| | | | |
|---|---|---|---|
| 8,559,165 B2* | 10/2013 | Matsuoka | H01G 9/028 361/517 |
| 8,614,879 B2* | 12/2013 | Takahashi | H01G 9/025 361/523 |
| 8,758,454 B2* | 6/2014 | Mitsuyama | H01G 9/0032 361/524 |
| 9,007,743 B2* | 4/2015 | Kawai | H01G 9/012 361/523 |

* cited by examiner

SOLID ELECTROLYTIC CAPACITOR PACKAGE STRUCTURE FOR INCREASING ELECTRICAL PERFORMANCES AND METHOD OF MANUFACTURING THE SAME, AND CAPACITOR UNIT THEREOF

BACKGROUND OF THE INVENTION

1. Field of the Invention

The present disclosure relates to a solid electrolytic capacitor package structure and a method of manufacturing the same, and a capacitor unit thereof, and more particularly to a solid electrolytic capacitor package structure for increasing electrical performances and a method of manufacturing the same, and a capacitor unit thereof.

2. Description of Related Art

Various applications of capacitors include home appliances, computer motherboards and peripherals, power supplies, communication products and automobiles. The capacitors such as solid electrolytic capacitors are mainly used to provide filtering, bypassing, rectifying, coupling, blocking or transforming function. Because the solid electrolytic capacitor has the advantages of small size, large electrical capacitance and good frequency characteristic, it can be used as a decoupling element in the power circuit of a central processing unit (CPU). In general, a plurality of capacitor elements is stacked together to form a stacked solid electrolytic capacitor with a high electrical capacitance. In addition, the stacked solid electrolytic capacitor of the prior art includes a plurality of capacitor elements and a lead frame. Each capacitor element includes an anode part, a cathode part and an insulating part. The insulating part is insulated from the anode part and the cathode part. More specifically, the cathode parts of the capacitor elements are stacked on top of one another.

SUMMARY OF THE INVENTION

One aspect of the present disclosure relates to a solid electrolytic capacitor package structure for increasing electrical performances and a method of manufacturing the same, and a capacitor unit thereof.

One of the embodiments of the present disclosure provides a solid electrolytic capacitor package structure for increasing electrical performances, comprising a capacitor unit, a package unit and a conductive unit. The capacitor unit includes a plurality of first capacitors sequentially stacked on top of one another and electrically connected with each other, and each first capacitor has a first positive portion and a first negative portion. The package unit includes a package resin body for enclosing the capacitor unit. The conductive unit includes a first conductive terminal and a second conductive terminal separated from the first conductive terminal. The first conductive terminal has a first embedded portion electrically connected to the first positive portion of the first capacitor and enclosed by the package resin body and a first exposed portion connected to the first embedded portion and exposed from the package resin body, and the second conductive terminal has a second embedded portion electrically connected to the first negative portion of the first capacitor and enclosed by the package resin body and a second exposed portion connected to the second embedded portion and exposed from the package resin body. More particularly, each first capacitor includes a valve metal foil, an oxide insulation layer for enclosing the valve metal foil, a conductive polymer composite material layer for covering one portion of the oxide insulation layer, a carbon paste layer for enclosing the conductive polymer composite material layer, and a silver paste layer for enclosing the carbon paste layer. More particularly, the conductive polymer composite material layer includes a conductive polymer material and a first nanometer material mixed with the conductive polymer material, the first nanometer material includes a plurality of first fully embedded nanometer structures completely enclosed by the conductive polymer material and a plurality of first partially exposed nanometer structures partially exposed from the conductive polymer material to contact the oxide layer or the carbon paste layer.

More particularly, the conductive polymer composite material layer includes a dispersion agent mixed with the conductive polymer material and the first nanometer material.

More particularly, the conductive polymer composite material layer includes a second nanometer material mixed with the conductive polymer material and the first nanometer material, the second nanometer material includes a plurality of second fully embedded nanometer structures completely enclosed by the conductive polymer material and a plurality of second partially exposed nanometer structures partially exposed from the conductive polymer material to contact the oxide layer or the carbon paste layer, and the conductive polymer composite material layer includes a dispersion agent mixed with the conductive polymer material, the first nanometer material and the second nanometer material. The first nanometer material is made of carbon nanotubes, graphene, metal nanowires, oxide nanoparticles or metal nanoparticles, and the second nanometer material is made of carbon nanotubes, graphene, metal nanowires, oxide nanoparticles or metal nanoparticles.

Another one of the embodiments of the present disclosure provides a method of manufacturing a solid electrolytic capacitor package structure for increasing electrical performances, comprising: providing a first conductive terminal and a second conductive terminal separated from the first conductive terminal; providing a capacitor unit including a plurality of first capacitors sequentially stacked on top of one another and electrically connected between the first conductive terminal and the second conductive terminal, wherein each first capacitor has a first positive portion and a first negative portion; forming a package resin body for enclosing the capacitor unit, wherein the first conductive terminal has a first embedded portion electrically connected to the first positive portion of the first capacitor and enclosed by the package resin body and a first exposed portion connected to the first embedded portion and exposed from the package resin body, and the second conductive terminal has a second embedded portion electrically connected to the first negative portion of the first capacitor and enclosed by the package resin body and a second exposed portion connected to the second embedded portion and exposed from the package resin body; and then bending the first exposed portion and the second exposed portion along an outer surface of the package resin body. More particularly, each first capacitor includes a valve metal foil, an oxide insulation layer for enclosing the valve metal foil, a conductive polymer composite material layer for covering one portion of the oxide insulation layer, a carbon paste layer for enclosing the conductive polymer composite material layer, and a silver paste layer for enclosing the carbon paste layer. More particularly, the conductive polymer composite material layer includes a conductive polymer material and a first nanometer material mixed with the conductive polymer material, the first nanometer material includes a plurality of first fully embedded nanometer structures completely enclosed by the conductive polymer material and a plurality of first partially exposed nanometer structures partially exposed from the conductive polymer material to contact the oxide layer or the carbon paste layer.

Yet another one of the embodiments of the present disclosure provides a capacitor unit for increasing electrical performances, comprising at least one first capacitor, the at least one first capacitor includes a conductive polymer composite material layer. More particularly, the conductive polymer composite material layer includes a conductive polymer material and a first nanometer material mixed with the conductive polymer material, and the first nanometer material includes a plurality of first fully embedded nanometer structures completely enclosed by the conductive polymer material and a plurality of first partially exposed nanometer structures partially exposed from the conductive polymer material.

Therefore, the electrical performances (such as electronic property, thermal stabilization, polymer impregnation ratio, capacitance, equivalent series resistance, dissipation factor, and leakage current etc.) of the solid electrolytic capacitor package structure are increased by matching the first nanometer material and the second nanometer material due to the design of "the conductive polymer composite material layer including a conductive polymer material and a first nanometer material mixed with the conductive polymer material" and "the first nanometer material including a plurality of first fully embedded nanometer structures completely enclosed by the conductive polymer material and a plurality of first partially exposed nanometer structures partially exposed from the conductive polymer material".

To further understand the techniques, means and effects of the present disclosure applied for achieving the prescribed objectives, the following detailed descriptions and appended drawings are hereby referred to, such that, and through which, the purposes, features and aspects of the present disclosure can be thoroughly and concretely appreciated. However, the appended drawings are provided solely for reference and illustration, without any intention to limit the present disclosure.

DETAILED DESCRIPTION OF THE PREFERRED EMBODIMENTS

The embodiments of "a solid electrolytic capacitor package structure for increasing electrical performances and a method of manufacturing the same, and a capacitor unit thereof" of the present disclosure are described. Other advantages and objectives of the present disclosure can be easily understood by one skilled in the art from the disclosure. The present disclosure can be applied in different embodiments. Various modifications and variations can be made to various details in the description for different applications without departing from the scope of the present disclosure. The drawings of the present disclosure are provided only for simple illustrations, but are not drawn to scale and do not reflect the actual relative dimensions. The following embodiments are provided to describe in detail the concept of the present disclosure, and are not intended to limit the scope thereof in any way.

Figure 1:
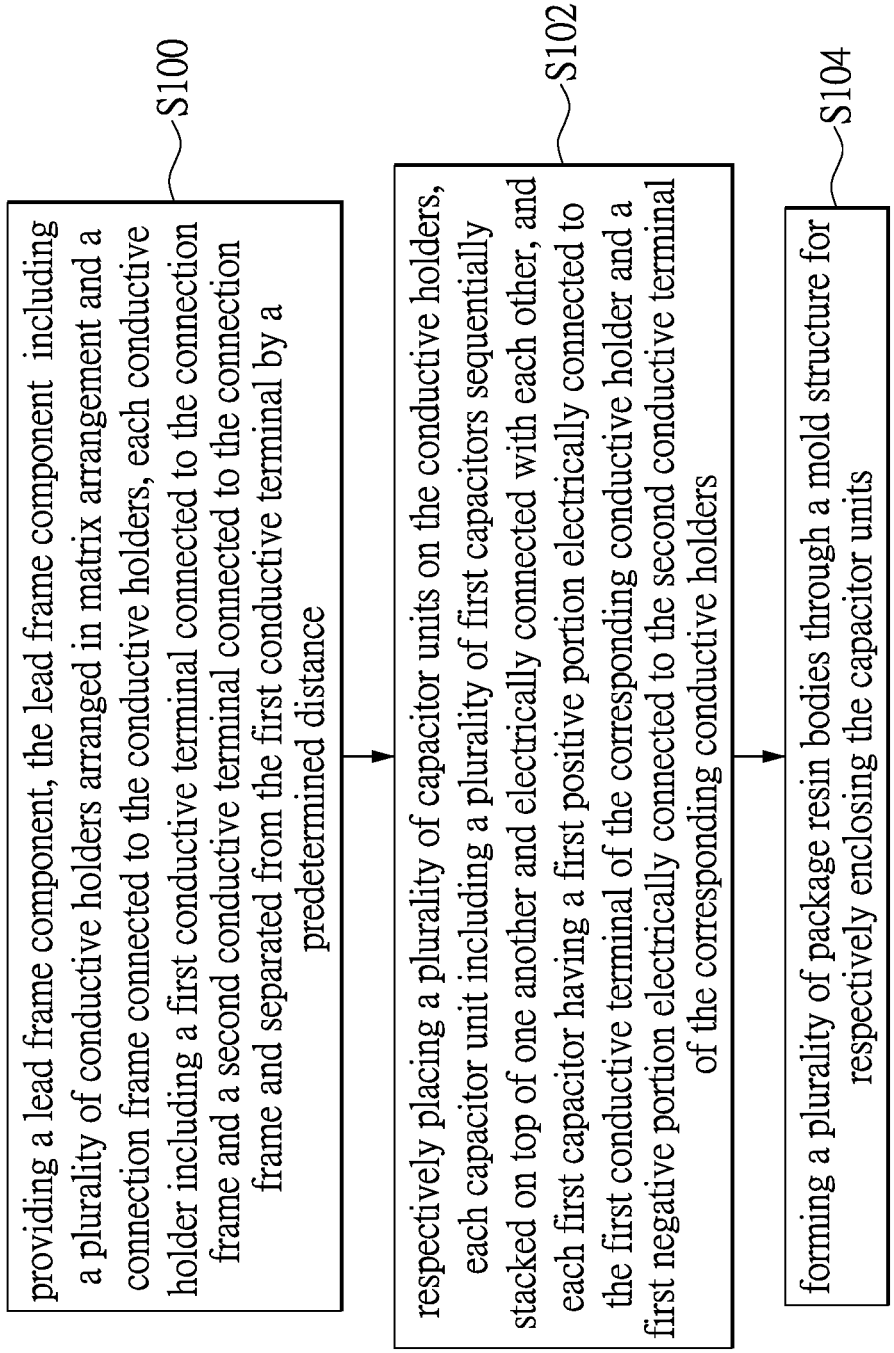
FIG. 1 shows a flowchart of the method of manufacturing a solid electrolytic capacitor package structure for increasing electrical performances according to one of embodiments of the present disclosure.

Referring to FIG. 1 to FIG. 10, the present disclosure provides a method of manufacturing a solid electrolytic capacitor package structure Z for increasing electrical performances, comprising the following steps:

First, referring to FIG. 1, FIG. 2, and FIG. 3, the step S100 is as follows: providing a lead frame component 1 (such as a lead frame), the lead frame component 1 including a plurality of conductive holders (supports) 10 arranged in matrix arrangement and a connection frame 11 connected to the conductive holders 10, each conductive holder 10 including a first conductive terminal 101 connected to the connection frame 11 and a second conductive terminal 102 connected to the connection frame 11 and separated from the first conductive terminal 101 by a predetermined distance. More particularly, the connection frame 11 has a surrounding frame portion 110 and a plurality of connection portions 111 connected with the surrounding frame portion 110 and surrounded by the surrounding frame portion 110. In addition, a first predetermined horizontal direction X1 and a second predetermined horizontal direction X2 are vertical to each other, any two adjacent first conductive terminals 101 or any two adjacent second conductive terminals 102 horizontally extended along the first predetermined horizontal direction X1 are separated from each other, and any two adjacent first conductive terminals 101 or any two adjacent second conductive terminals 102 horizontally extended along the second predetermined horizontal direction X2 are connected with each other through the connection frame 11 and symmetrically disposed on opposite sides of the corresponding connection portion 111.

Figure 3:
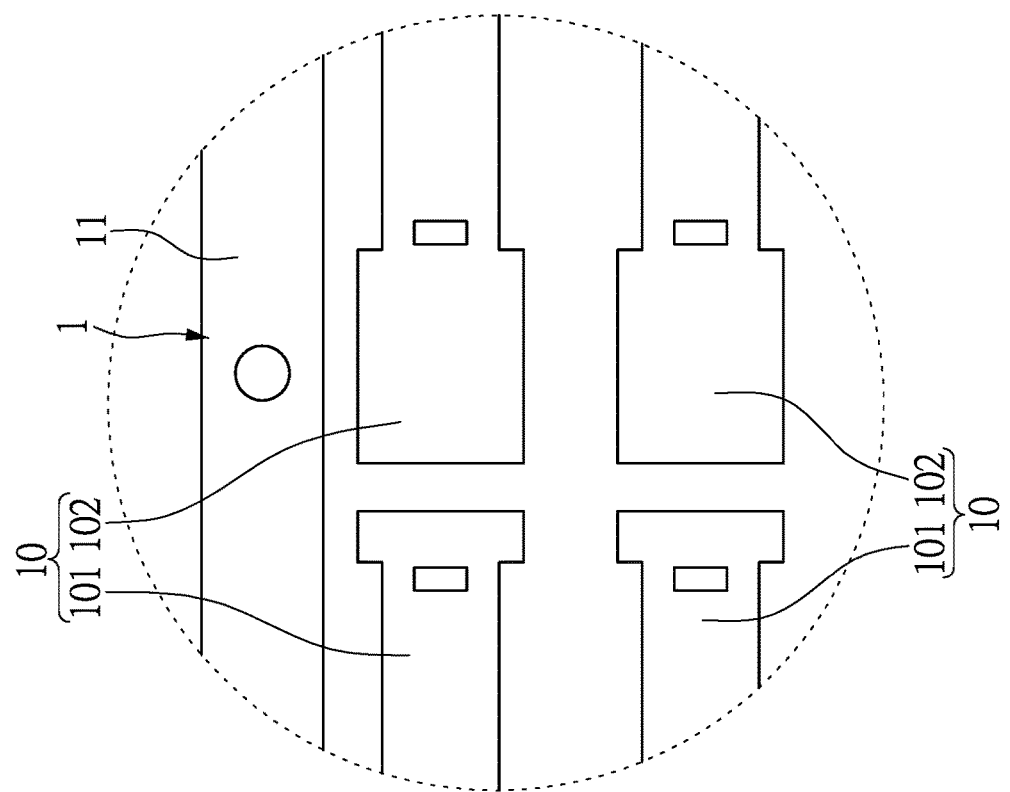
FIG. 3 shows an enlarged view taken on part A of FIG. 2.
Figure 4:
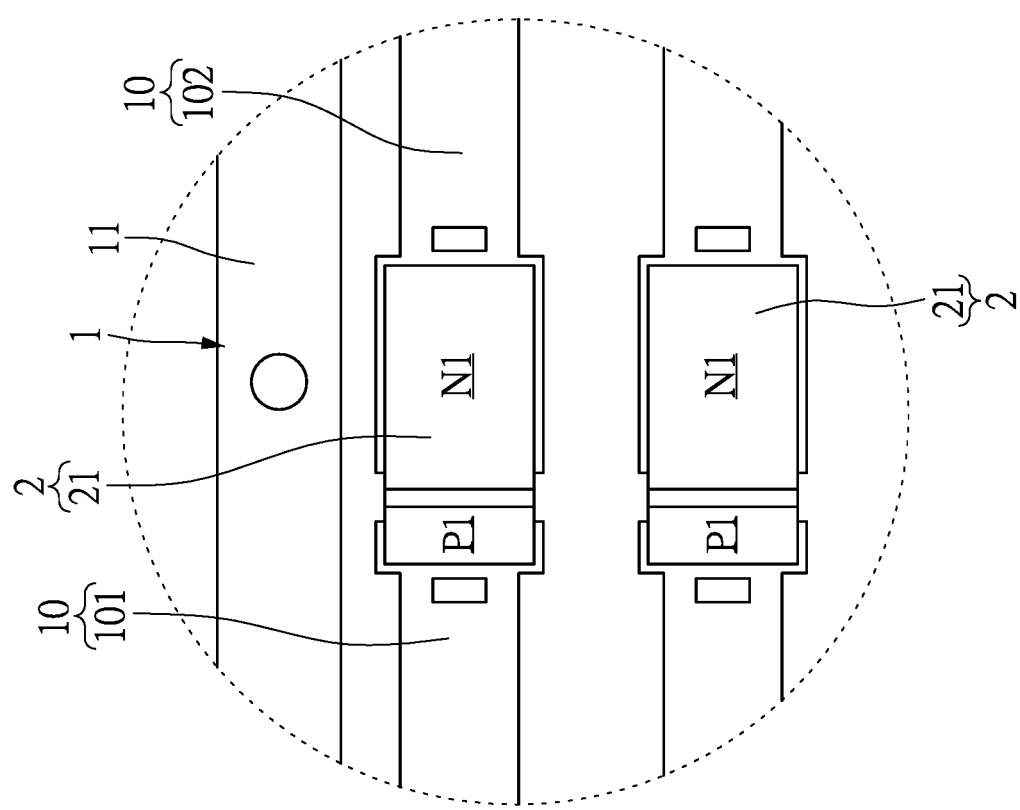
FIG. 4 shows an enlarged, schematic view of the manufacturing step S102 of the method of manufacturing a solid electrolytic capacitor package structure for increasing electrical performances according to the present disclosure.

Next, referring to FIG. 1, FIG. 3, and FIG. 4, the step S102 is as follows: respectively placing a plurality of capacitor units 2 on the conductive holders 10, each capacitor unit 2 including a plurality of first capacitors 21 sequentially stacked on top of one another and electrically connected with each other, and each first capacitor 21 having a first positive portion P1 electrically connected to the first conductive terminal 101 of the corresponding conductive holder 10 and a first negative portion N1 electrically connected to the second conductive terminal 102 of the corresponding conductive holders 10. For example, the first capacitor 21 may be a chip-type solid electrolytic capacitor, a winding-type solid electrolytic capacitor or a tantalum solid electrolytic capacitor. The first capacitor 21 is used as a chip-type solid electrolytic capacitor in the embodiments of the present disclosure, but it is merely an example and is not meant to limit the present disclosure.

Then, referring to FIG. 1, FIG. 5, and FIG. 6, the step S104 is as follows: forming a plurality of package resin bodies 30 through a mold structure M for respectively enclosing the capacitor units 2. For example, as shown in FIG. 6, the mold structure M includes a major flow channel M1 and at least four minor flow channels M2 communicated with the major flow channel M1, and each minor flow channel M2 has a plurality of resin injection passages M20 extended along the same direction. In addition, the resin injection passages M20 of each minor flow channel M2 correspond to the lead frame component 1, so that the package resin body 30 (such as opaque package material) can sequentially passes through the major flow channel M1, and the corresponding minor flow channels M2 and the resin injection passages M20 thereof to partially enclose the lead frame component 1. In other words, because the resin injection passages M20 of any one of the minor flow channels M2 can correspond to the lead frame component 1, the package resin body 30 can sequentially passes through the major flow channel M1, the corresponding minor flow channels M2, and the resin injection passages M20 to partially enclose the corresponding lead frame component 1.

Figure 2:
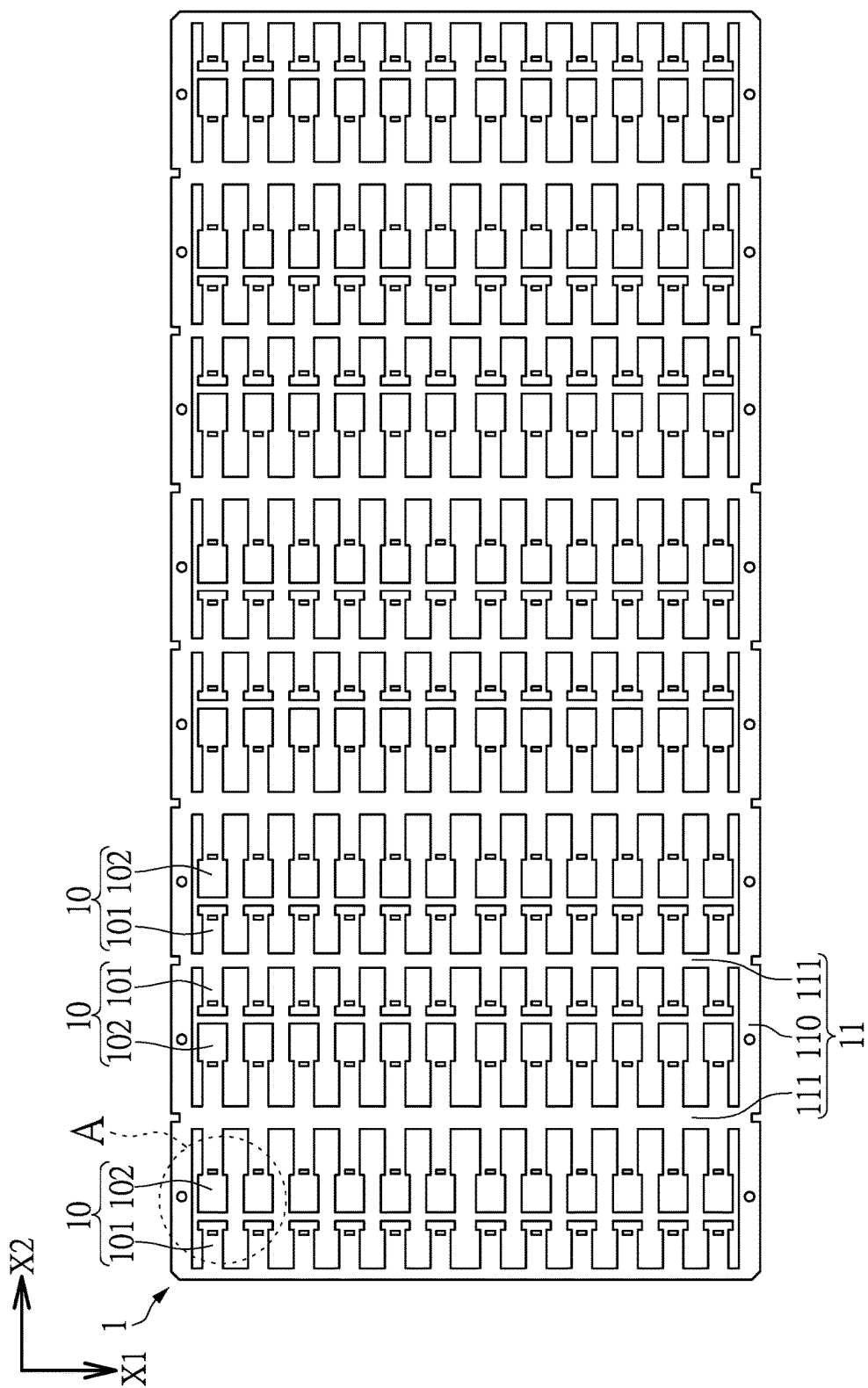
FIG. 2 shows a schematic view of the lead frame component of the solid electrolytic capacitor package structure for increasing electrical performances according to the present disclosure.
Figure 5:
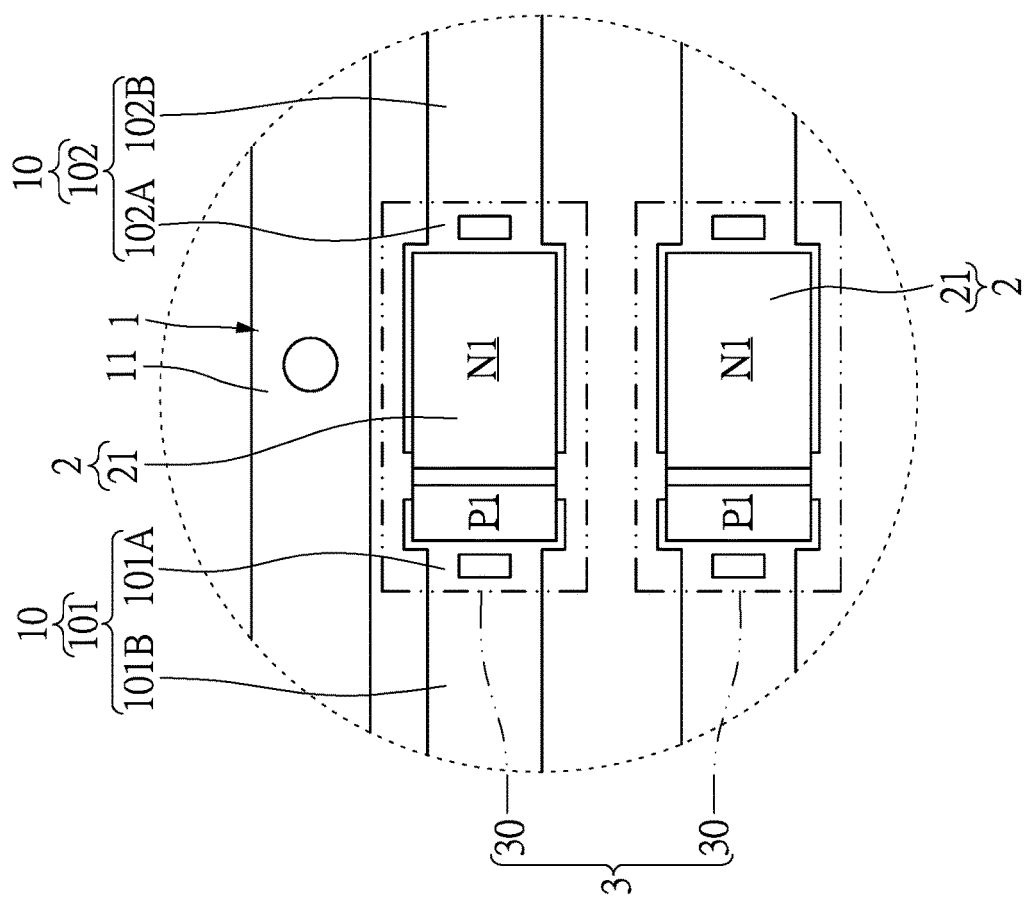
FIG. 5 shows an enlarged, schematic view of the manufacturing step S104 of the method of manufacturing a solid electrolytic capacitor package structure for increasing electrical performances according to the present disclosure.
Figure 6:
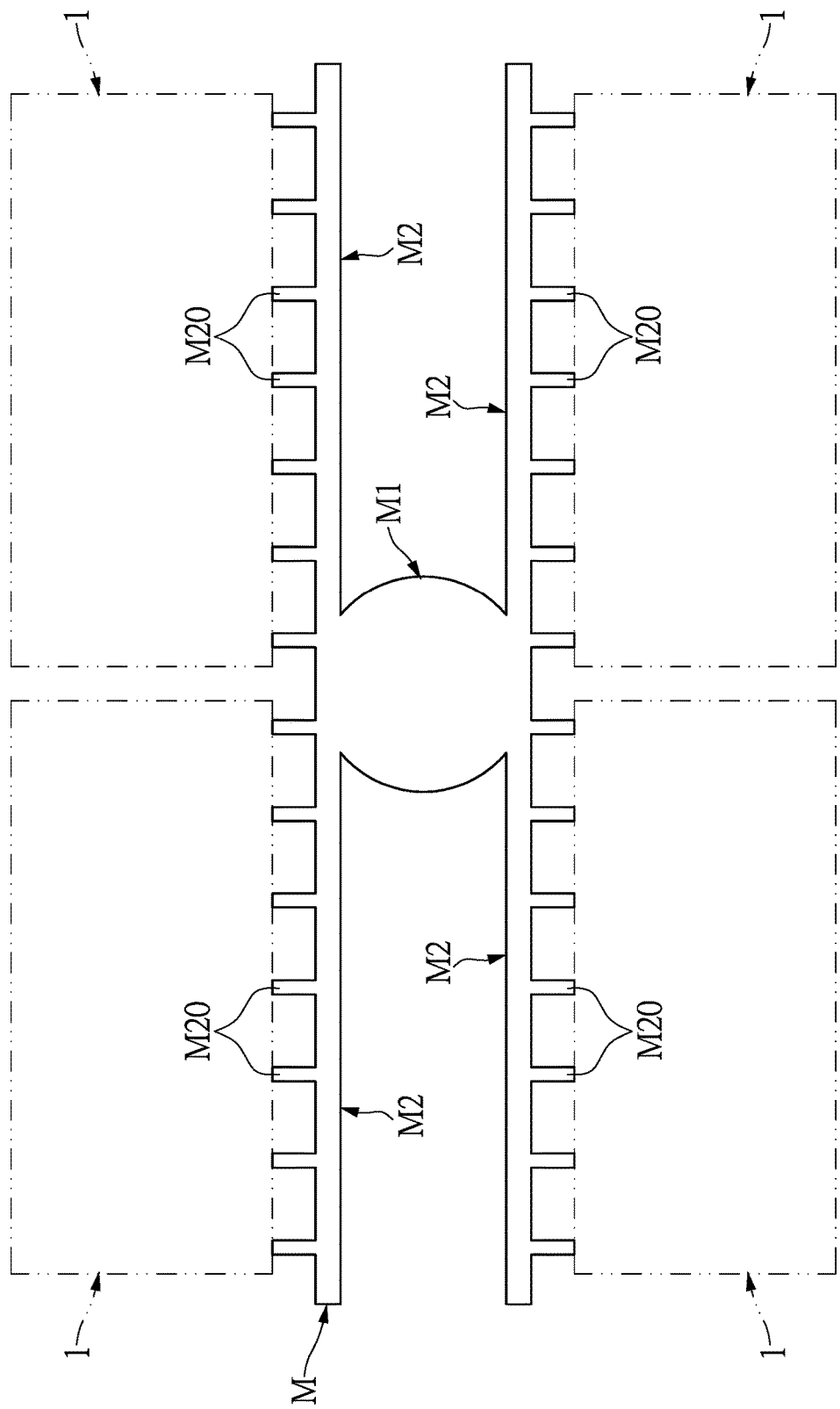
FIG. 6 shows a schematic view of the mold structure used by the solid electrolytic capacitor package structure for increasing electrical performances according to the present disclosure.
Figure 7:
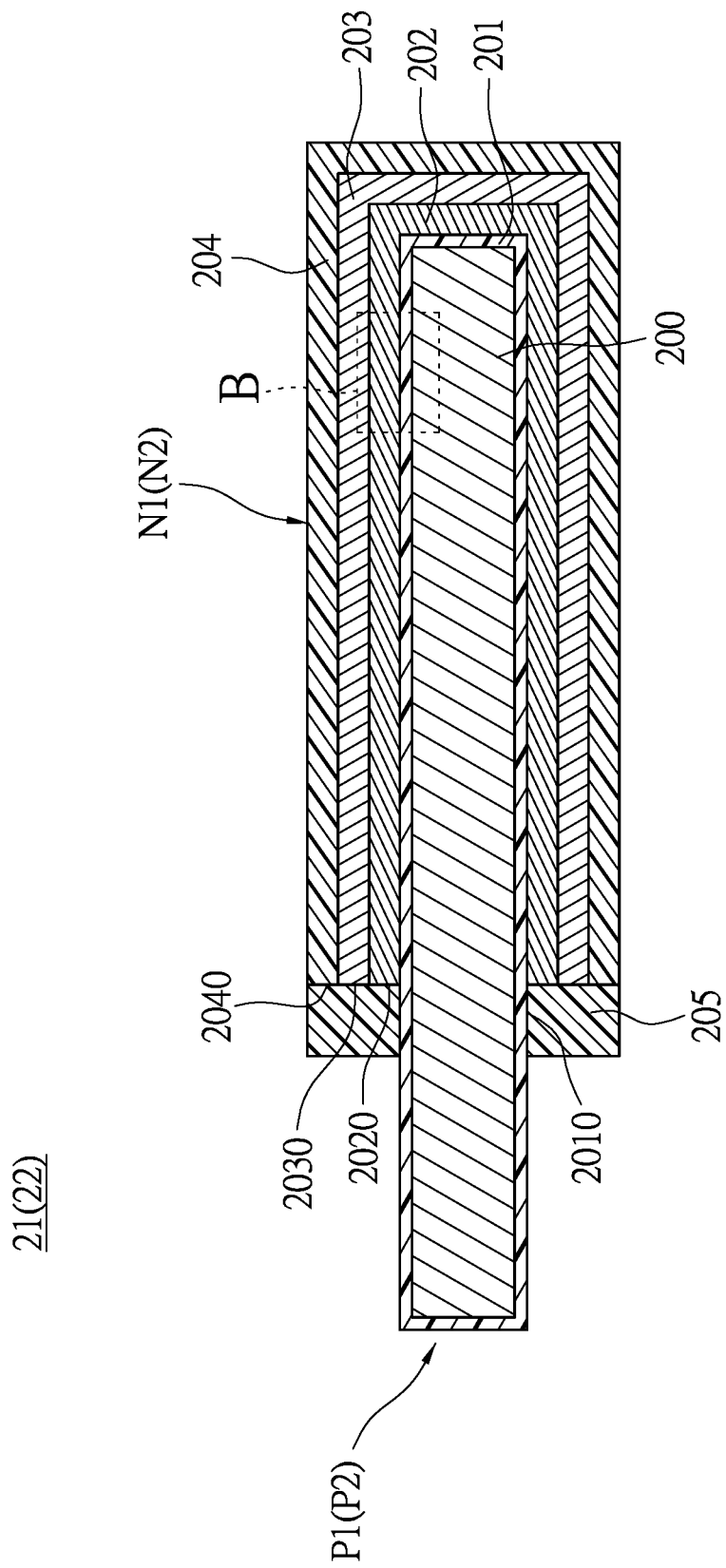
FIG. 7 shows a lateral, cross-sectional, schematic view of a single first capacitor or a single second capacitor of the solid electrolytic capacitor package structure for increasing electrical performances according to the present disclosure.

Referring to FIG. 2, FIG. 5, and FIG. 7, the present disclosure further provides a solid electrolytic capacitor package structure Z for increasing electrical performances, comprising: a lead frame component 1, a plurality of capacitor units 2, and a package unit 3. The lead frame component 1 includes a plurality of conductive holders 10 arranged in matrix arrangement and a connection frame 11 connected to the conductive holders 10, and each conductive holder 10 includes a first conductive terminal 101 connected to the connection frame 11 and a second conductive terminal 102 connected to the connection frame 11 and separated from the first conductive terminal 101 by a predetermined distance. Moreover, the capacitor units 2 are respectively disposed on the conductive holders 10. Each capacitor unit 2 includes a plurality of first capacitors 21 sequentially stacked on top of one another and electrically connected with each other, and each first capacitor 21 has a first positive portion P1 electrically connected to the first conductive terminal 101 of the corresponding conductive holder 10 and a first negative portion N1 electrically connected to the second conductive terminal 102 of the corresponding conductive holder 10. In addition, the package unit 3 includes a plurality of package resin bodies 30 for respectively enclosing (encapsulating) the capacitor units 30.

More particularly, as shown in FIG. 5, the first conductive terminal 101 of each conductive holder 10 has a first embedded portion 101A electrically connected to the first positive portion P1 of the first capacitor 21 (that is to say, the first embedded portion 101A is electrically connected to the first positive portion P1 of the bottommost first capacitor 21) of the corresponding capacitor unit 2 and enclosed by the corresponding package resin body 30 and a first exposed portion 101B connected to the first embedded portion 101A and exposed from and outside the corresponding package resin body 30. In addition, the second conductive terminal 102 of each conductive holder 10 has a second embedded portion 102A electrically connected to the first negative portion N1 of the first capacitor 21 (that is to say, the second embedded portion 102A is electrically connected to the first negative portion N1 of the bottommost first capacitor 21) of the corresponding capacitor unit 2 and enclosed by the corresponding package resin body 30 and a second exposed portion 102B connected to the second embedded portion 102A and exposed from the corresponding package resin body 30.

Figure 8:
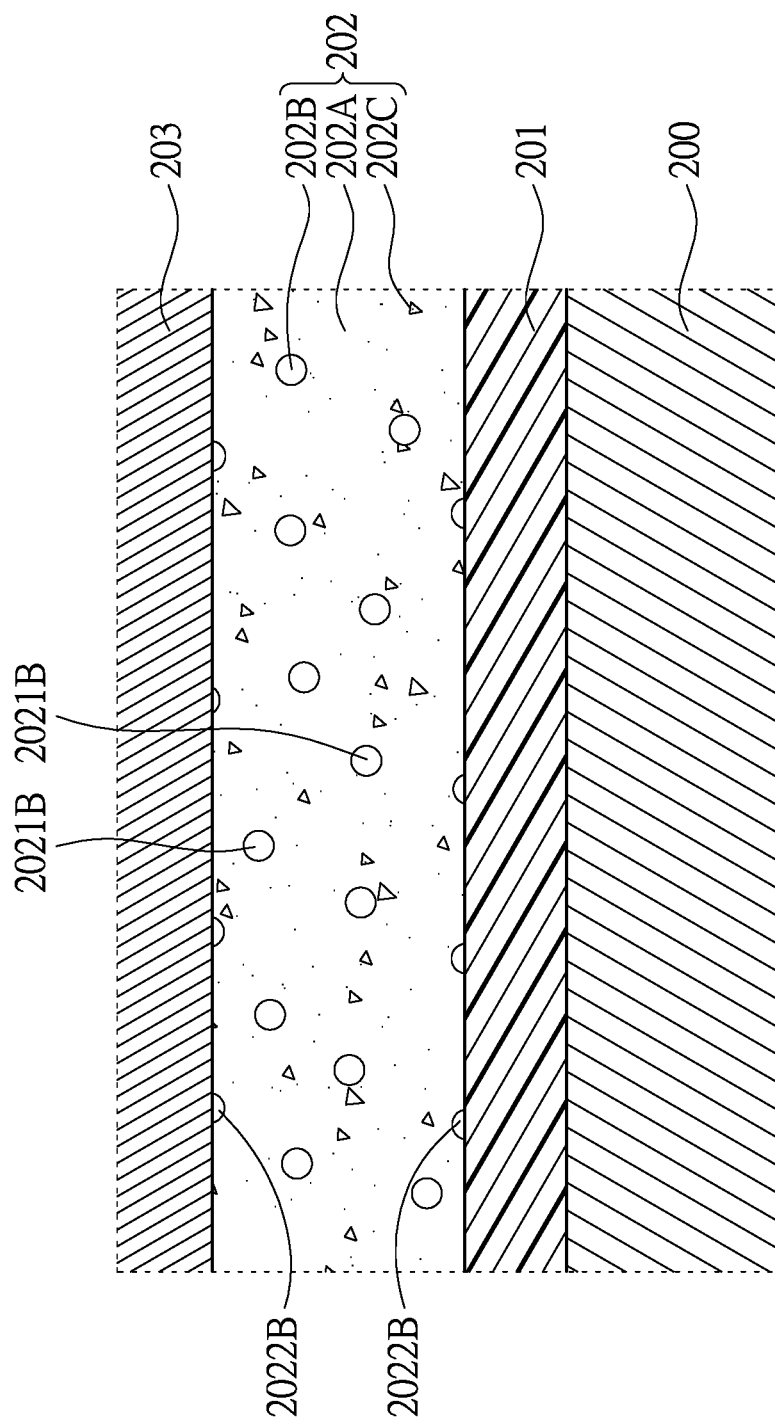
FIG. 8 shows an enlarged view taken on part B of FIG. 7.

More particularly, referring to FIG. 7 and FIG. 8, each first capacitor 21 includes a valve metal foil 200, an oxide insulation layer 201 for enclosing the valve metal foil 200, a conductive polymer composite material layer 202 for covering one portion of the oxide insulation layer 201, a carbon paste layer 203 for enclosing the conductive polymer composite material layer 202, and a silver paste layer 204 for enclosing the carbon paste layer 203.

For example, as shown in FIG. 7, each first capacitor 21 has a surrounding insulating layer 205 disposed on the outer surface of the oxide insulation layer 201 and around the outer surface of the oxide insulation layer 201, and the lengths of the conductive polymer composite material layer 202, the carbon paste layer 203, and the silver paste layer 204 of each first capacitor 21 are limited by the corresponding surrounding insulating layer 205. Furthermore, the oxide insulation layer 201 has a surrounding region 2010 formed on the outer surface thereof, and the surrounding insulating layer 205 of each first capacitor 21 is surroundingly disposed on the surrounding region 2010 of the corresponding oxide insulation layer 201 and contacting an end 2020 of the corresponding conductive polymer composite material layer 202, an end 2030 of the corresponding carbon paste layer 203, and an end 2040 of the corresponding silver paste layer 204. However, the first capacitor 21 used in the present disclosure is merely an example and is not meant to limit the present disclosure.

For example, as shown in FIG. 8, the conductive polymer composite material layer 202 includes a conductive polymer material 202A and a first nanometer material 202B mixed with (such as combined with) the conductive polymer material 202A, and the first nanometer material 202B may be made of carbon nanotubes, graphene, metal nanowires (such as silver nanowires), oxide nanoparticles or metal nanoparticles (such as silver nanoparticles). In addition, the first nanometer material 202B includes a plurality of first fully embedded nanometer structures 2021B completely enclosed by the conductive polymer material 202A and a plurality of first partially exposed nanometer structures 2022B partially exposed from the conductive polymer material 202A to contact the oxide layer 201 or the carbon paste layer 203. Moreover, the conductive polymer composite material layer 202 further includes a dispersion agent 202C (or a first surface active agent) mixed with the conductive polymer material 202A and the first nanometer material 202B, so that the conductive polymer material 202A and the first nanometer material 202B can be uniformly mixed with other by the dispersion agent 202C.

Figure 9:
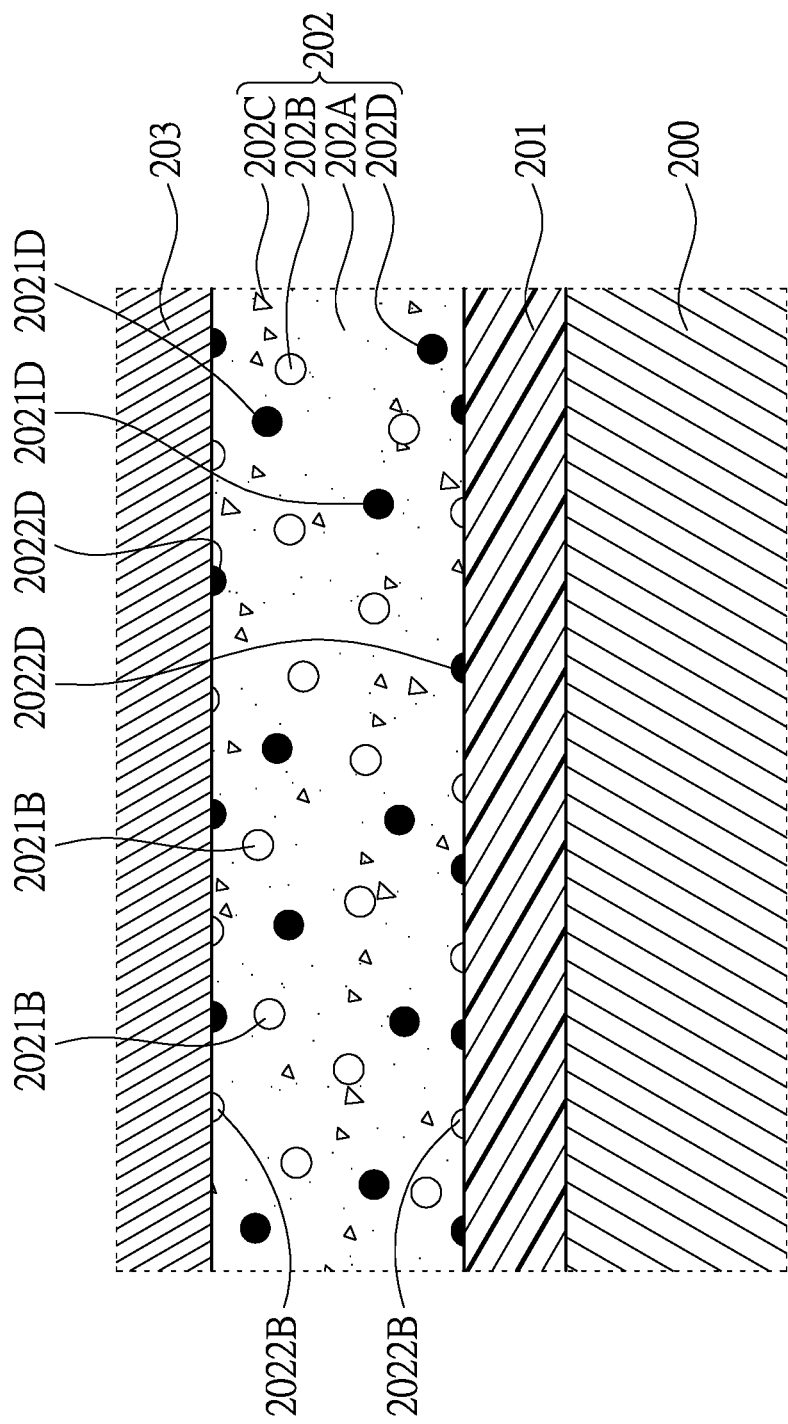
FIG. 9 shows a partial, cross-sectional, schematic view of the conductive polymer composite material layer further including a second nanometer material according to the present disclosure.

For example, as shown in FIG. 9, the conductive polymer composite material layer 202 further includes a second nanometer material 202D mixed with the conductive polymer material 202A and the first nanometer material 202B, and the second nanometer material 202D may be made of carbon nanotubes, graphene, metal nanowires (such as silver nanowires), oxide nanoparticles or metal nanoparticles (such as silver nanoparticles). In addition, the second nanometer material 202D includes a plurality of second fully embedded nanometer structures 2021D completely enclosed by the conductive polymer material 202A and a plurality of second partially exposed nanometer structures 2022D partially exposed from the conductive polymer material 202A to contact the oxide layer 201 or the carbon paste layer 203. Please note, all of the conductive polymer material 202A, the first nanometer material 202B and the second nanometer material 202D can be uniformly mixed with other by the dispersion agent 202C.

Therefore, the electrical performances of the solid electrolytic capacitor package structure Z can be increased by matching the first nanometer material 202B and the second nanometer material 202D, and the electrical performances include an electronic property, a thermal stabilization, a polymer impregnation ratio, a capacitance (Cap), an equivalent series resistance (ESR), a dissipation factor (DF), and a leakage current (LC) etc. Compare the prior art without using any nanometer material with the present disclosure using nanometer materials by experimenting, the electrical performances of the present disclosure using nanometer materials is better than the electrical performances of the prior art without using any nanometer material as shown in the following table:

| | Cap (μF) | DF (%) | ESR (mΩ) | LC (μA) | ΔCap (760 hr at 130° C.) | ΔESR (760 hr at 130° C.) |
|---|---|---|---|---|---|---|
| Prior art without using nanometer material | 45.8 | 3.2 | 28 | 30 | −13% | 39% |
| Present disclosure using nanometer materials | 50.1 | 2.7 | 22 | 6 | −1% | 10% |

Please note, the conductive polymer material 202A may be poly(3,4-ethylenedioxythiophene)-poly(4-styrenesulfonate) (PEDOT-PSS), and PEDOT-PSS has been applied to various fields due to stability in air and higher electrical conductivity at room temperature than other polymers. Particularly, a material prepared by doping PEDOT with poly(4-styrenesulfonate) (PSS) as a dopant is widely used as a material for electrodes or an antistatic material since it can be applied very evenly and has excellent interfacial properties and adhesion.

Figure 10:
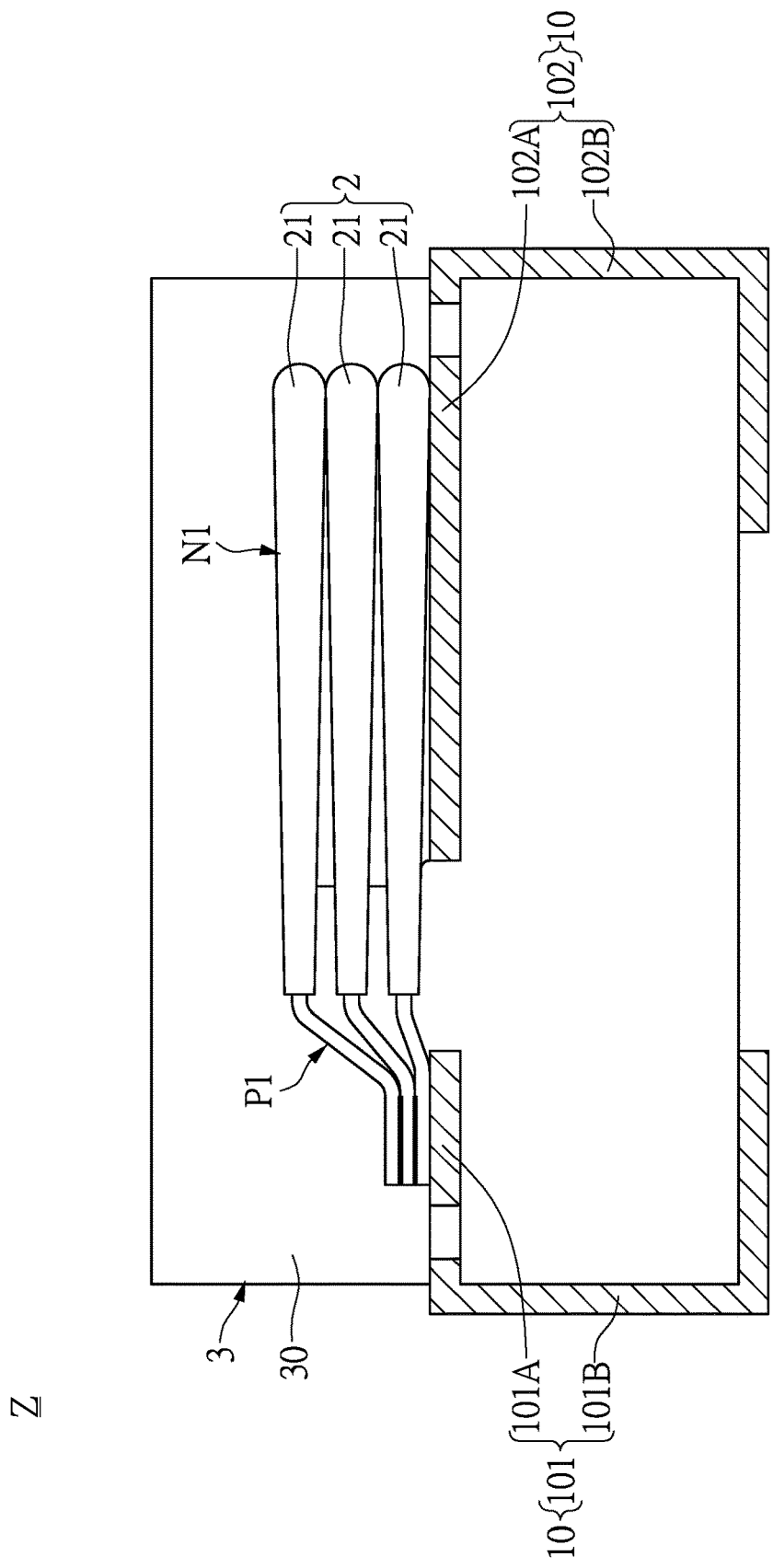
FIG. 10 shows a lateral, cross-sectional, schematic view of the solid electrolytic capacitor package structure for increasing electrical performances using a plurality of first capacitors according to the present disclosure.
Figure 11:
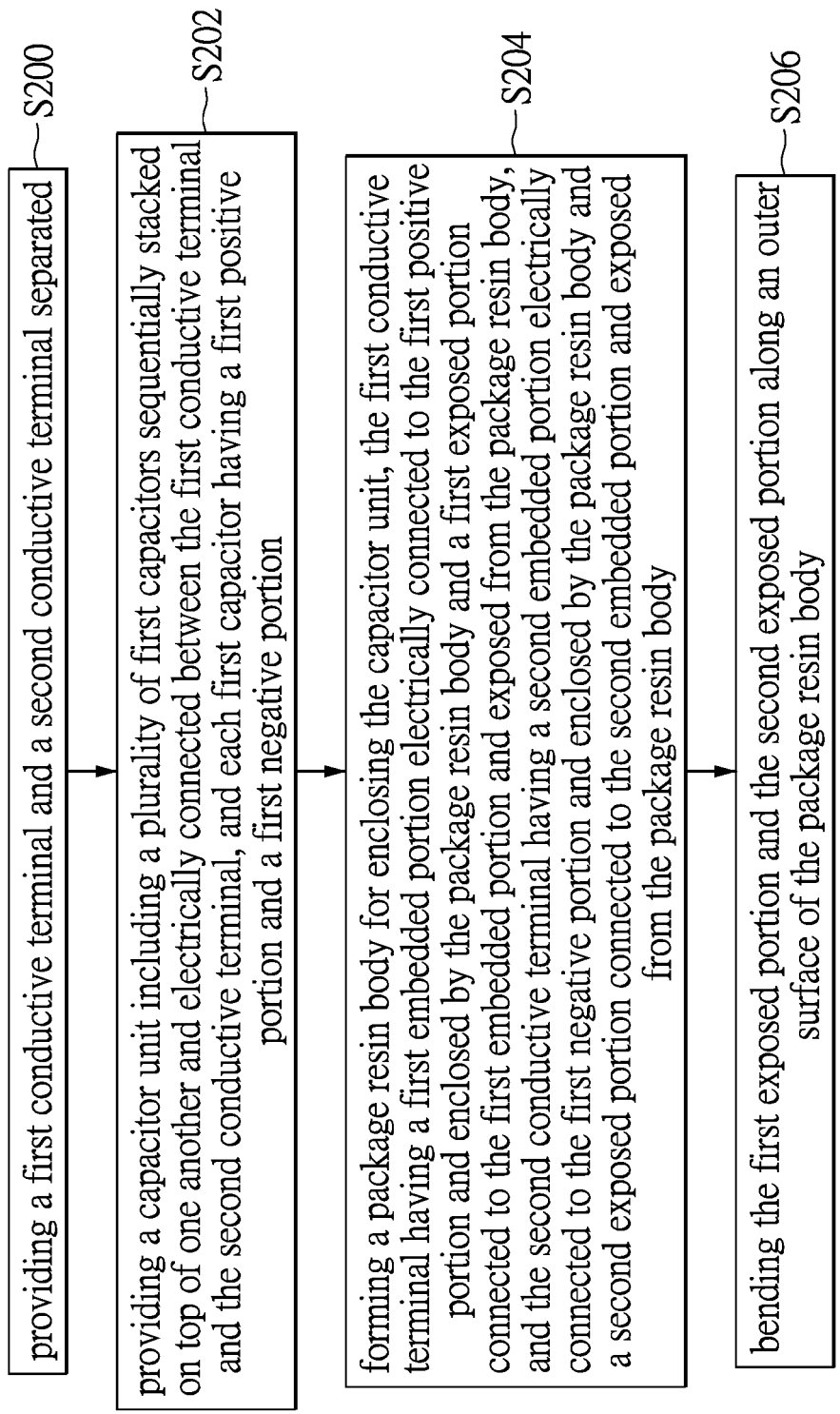
FIG. 11 shows a flowchart of the method of manufacturing a solid electrolytic capacitor package structure for increasing electrical performances according to another one of embodiments of the present disclosure.

Please note, referring to FIG. 10 and FIG. 11, the present disclosure provides a method of manufacturing a single solid electrolytic capacitor package structure Z for increasing electrical performance, comprising: providing a first conductive terminal 101 and a second conductive terminal separated 102 from the first conductive terminal 101 (S200); providing a capacitor unit 2 including a plurality of first capacitors 21 sequentially stacked on top of one another and electrically connected between the first conductive terminal 101 and the second conductive terminal 102, and each first capacitor 21 having a first positive portion P1 and a first negative portion N1 (S202); forming a package resin body 30 for enclosing the capacitor unit 2, the first conductive terminal 101 having a first embedded portion 101A electrically connected to the first positive portion P1 of the first capacitor 21 and enclosed by the package resin body 30 and a first exposed portion 101B connected to the first embedded portion 101A and exposed from the package resin body 30, and the second conductive terminal 102 having a second embedded portion 102A electrically connected to the first negative portion N1 of the first capacitor 21 and enclosed by the package resin body 30 and a second exposed portion 102B connected to the second embedded portion 102A and exposed from the package resin body 30 (S204); and then bending the first exposed portion 101B and the second exposed portion 102B along an outer surface of the package resin body 30 (S206).

Please note, referring to FIG. 5, FIG. 10 and FIG. 11, after cutting the lead frame component 1, both the first exposed portion 101B and the second exposed portion 102B can be bent along an outer surface of the package resin body 30 to form the solid electrolytic capacitor package structure for increasing electrical performances Z. More particularly, the two first negative portions N1 of the two adjacent first capacitors 21 are stacked on top of one another by silver paste (no label), and the two first positive portions P1 of the two adjacent first capacitors 21 are stacked on top of one another by a soldering layer (no label).

Figure 12:
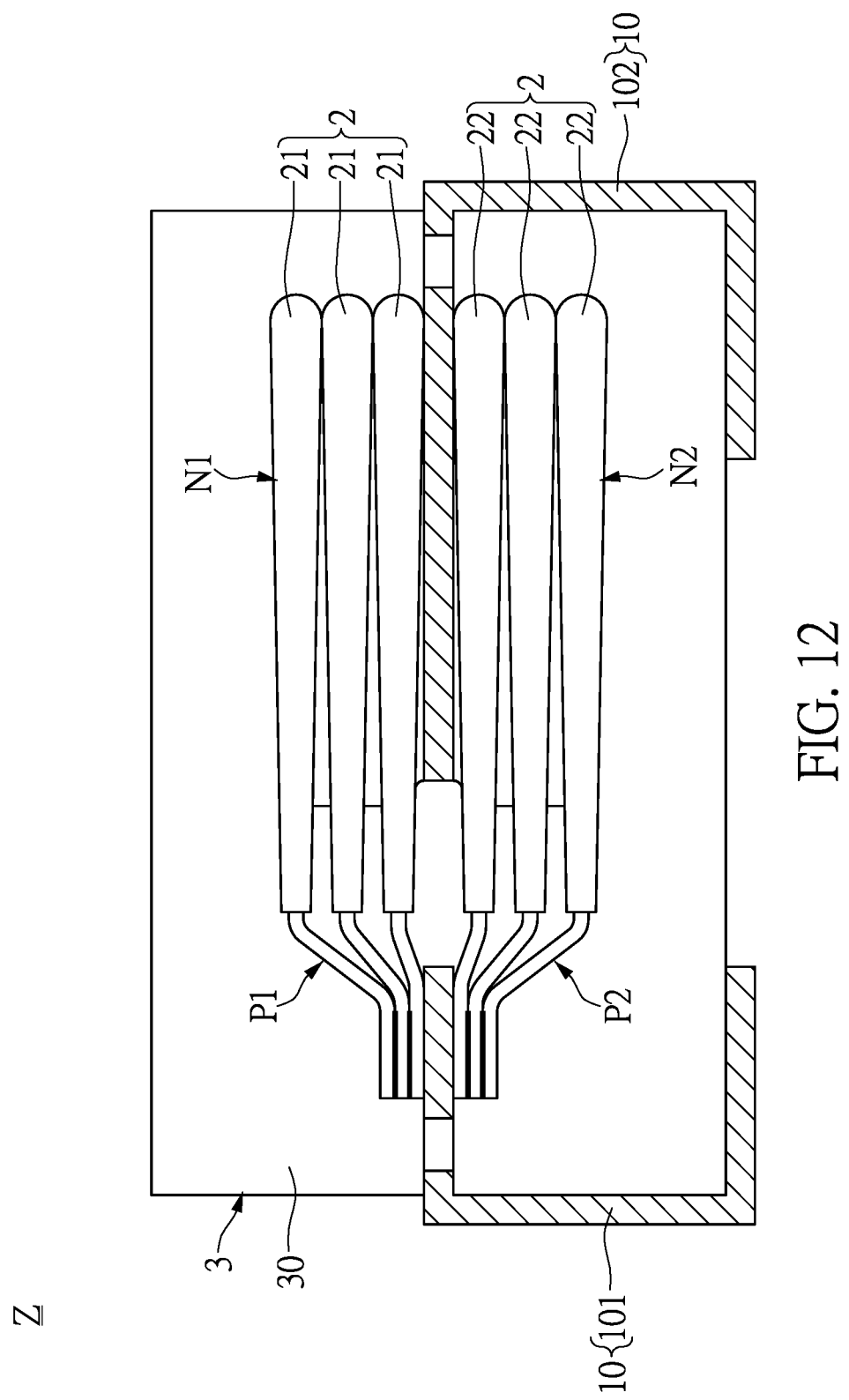
FIG. 12 shows a lateral, cross-sectional, schematic view of the solid electrolytic capacitor package structure for increasing electrical performances using a plurality of first capacitors and a plurality of second capacitors according to the present disclosure.

Please note, referring to FIG. 5 and FIG. 12, the capacitor unit 2 further includes a plurality of second capacitors 22 sequentially stacked on top of one another and electrically connected with each other, and each second capacitor 22 has a second positive portion P2 electrically connected to the first conductive terminal 101 of the corresponding conductive holder 10 and a second negative portion N2 electrically connected to the second conductive terminal 102 of the corresponding conductive holder 10. In addition, the first capacitors 21 of each capacitor unit 2 are disposed on a top surface of the corresponding conductive holder 10, and the second capacitors 22 of each capacitor unit 2 are disposed on a bottom surface of the corresponding conductive holder 10. In other words, the first capacitors 21 are disposed on a top surface of the first embedded portion 101A of the first conductive terminal 101, and the second capacitors 22 are disposed on a bottom surface of the first embedded portion 101A of the first conductive terminal 101. For example, the second capacitors 22 may be a chip-type solid electrolytic capacitor, a winding-type solid electrolytic capacitor or a tantalum solid electrolytic capacitor. The second capacitor 22 is used as a chip-type solid electrolytic capacitor in the embodiments of the present disclosure, but it is merely an example and is not meant to limit the present disclosure.

More particularly, as shown in FIG. 7, each second capacitor 22 includes a valve metal foil 200, an oxide insulation layer 201 for enclosing the valve metal foil 200, a conductive polymer composite material layer 202 for covering one portion of the oxide insulation layer 201, a carbon paste layer 203 for enclosing the conductive polymer composite material layer 202, and a silver paste layer 204 for enclosing the carbon paste layer 203. In addition, each second capacitor 22 has a surrounding insulating layer 205 disposed on the outer surface of the oxide insulation layer 201 and around the outer surface of the oxide insulation layer 201, and the lengths of the conductive polymer composite material layer 202, the carbon paste layer 203, and the silver paste layer 204 of each second capacitor 22 are limited by the corresponding surrounding insulating layer 205. Furthermore, the oxide insulation layer 201 has a surrounding region 2010 formed on the outer surface thereof, and the surrounding insulating layer 205 of each second capacitor 22 is surroundingly disposed on the surrounding region 2010 of the corresponding oxide insulation layer 201 and contacting an end 2020 of the corresponding conductive polymer composite material layer 202, an end 2030 of the corresponding carbon paste layer 203, and an end 2040 of the corresponding silver paste layer 204. However, the second capacitor 22 used in the present disclosure is merely an example and is not meant to limit the present disclosure.

In conclusion, the electrical performances (such as electronic property, thermal stabilization, polymer impregnation ratio, capacitance, equivalent series resistance, dissipation factor, and leakage current etc.) of the solid electrolytic capacitor package structure Z are increased by matching the first nanometer material 202B and the second nanometer material 202D due to the design of "the conductive polymer composite material layer 202 including a conductive polymer material 202A and a first nanometer material 202B mixed with the conductive polymer material 202A" and "the first nanometer material 202B including a plurality of first fully embedded nanometer structures 2021B completely enclosed by the conductive polymer material 202A and a plurality of first partially exposed nanometer structures 2022B partially exposed from the conductive polymer material 202A".

The aforementioned descriptions merely represent the preferred embodiments of the present disclosure, without any intention to limit the scope of the present disclosure which is fully described only within the following claims. Various equivalent changes, alterations or modifications based on the claims of the present disclosure are all, consequently, viewed as being embraced by the scope of the present disclosure.

What is claimed is as follows:

1. A solid electrolytic capacitor package structure for increasing electrical performances, comprising:
    a capacitor unit including a plurality of first capacitors sequentially stacked on top of one another and electrically connected with each other, wherein each first capacitor has a first positive portion and a first negative portion;
    a package unit including a package resin body for enclosing the capacitor unit; and
    a conductive unit including a first conductive terminal and a second conductive terminal separated from the first conductive terminal, wherein the first conductive terminal has a first embedded portion electrically connected to the first positive portion of the first capacitor and enclosed by the package resin body and a first exposed portion connected to the first embedded portion and exposed from the package resin body, and the second conductive terminal has a second embedded portion electrically connected to the first negative portion of the first capacitor and enclosed by the package resin body and a second exposed portion connected to the second embedded portion and exposed from the package resin body;
    wherein each first capacitor includes a valve metal foil, an oxide insulation layer for enclosing the valve metal foil, a conductive polymer composite material layer for covering one portion of the oxide insulation layer, a carbon paste layer for enclosing the conductive polymer composite material layer, and a silver paste layer for enclosing the carbon paste layer;
    wherein the conductive polymer composite material layer includes a conductive polymer material and a first nanometer material mixed with the conductive polymer material, the first nanometer material includes a plurality of first fully embedded nanometer structures completely enclosed by the conductive polymer material and a plurality of first partially exposed nanometer structures partially exposed from the conductive polymer material to contact the oxide layer or the carbon paste layer.

2. The solid electrolytic capacitor package structure of claim 1, wherein the conductive polymer composite material layer includes a dispersion agent mixed with the conductive polymer material and the first nanometer material.

3. The solid electrolytic capacitor package structure of claim 1, wherein the conductive polymer composite material layer includes a second nanometer material mixed with the conductive polymer material and the first nanometer material, the second nanometer material includes a plurality of second fully embedded nanometer structures completely enclosed by the conductive polymer material and a plurality of second partially exposed nanometer structures partially exposed from the conductive polymer material to contact the oxide layer or the carbon paste layer, and the conductive polymer composite material layer includes a dispersion agent mixed with the conductive polymer material, the first nanometer material and the second nanometer material, wherein the first nanometer material is made of carbon nanotubes, graphene, metal nanowires, oxide nanoparticles or metal nanoparticles, and the second nanometer material is made of carbon nanotubes, graphene, metal nanowires, oxide nanoparticles or metal nanoparticles.

4. The solid electrolytic capacitor package structure of claim 1, wherein each first capacitor has a surrounding insulating layer disposed on an outer surface of the oxide insulation layer and around the outer surface of the oxide insulation layer, and the lengths of the conductive polymer composite material layer, the carbon paste layer, and the silver paste layer of the first capacitor are limited by the surrounding insulating layer, wherein the oxide insulation layer has a surrounding region formed on the outer surface thereof, and the surrounding insulating layer of the first capacitor is surroundingly disposed on the surrounding region of the oxide insulation layer for contacting an end of the conductive polymer composite material layer, an end of the carbon paste layer, and an end of the silver paste layer.

5. The solid electrolytic capacitor package structure of claim 1, wherein the capacitor unit includes a plurality of second capacitors sequentially stacked on top of one another and electrically connected with each other, and each second capacitor has a second positive portion and a second negative portion, wherein the first capacitors are disposed on a top surface of the first embedded portion of the first conductive terminal, and the second capacitors are disposed on a bottom surface of the first embedded portion of the first conductive terminal.

6. A method of manufacturing a solid electrolytic capacitor package structure for increasing electrical performances, comprising:
    providing a first conductive terminal and a second conductive terminal separated from the first conductive terminal;
    providing a capacitor unit including a plurality of first capacitors sequentially stacked on top of one another and electrically connected between the first conductive terminal and the second conductive terminal, wherein each first capacitor has a first positive portion and a first negative portion;

forming a package resin body for enclosing the capacitor unit, wherein the first conductive terminal has a first embedded portion electrically connected to the first positive portion of the first capacitor and enclosed by the package resin body and a first exposed portion connected to the first embedded portion and exposed from the package resin body, and the second conductive terminal has a second embedded portion electrically connected to the first negative portion of the first capacitor and enclosed by the package resin body and a second exposed portion connected to the second embedded portion and exposed from the package resin body; and bending the first exposed portion and the second exposed portion along an outer surface of the package resin body;

wherein each first capacitor includes a valve metal foil, an oxide insulation layer for enclosing the valve metal foil, a conductive polymer composite material layer for covering one portion of the oxide insulation layer, a carbon paste layer for enclosing the conductive polymer composite material layer, and a silver paste layer for enclosing the carbon paste layer;

wherein the conductive polymer composite material layer includes a conductive polymer material and a first nanometer material mixed with the conductive polymer material, the first nanometer material includes a plurality of first fully embedded nanometer structures completely enclosed by the conductive polymer material and a plurality of first partially exposed nanometer structures partially exposed from the conductive polymer material to contact the oxide layer or the carbon paste layer.

7. The method of claim 6, wherein the conductive polymer composite material layer includes a dispersion agent mixed with the conductive polymer material and the first nanometer material.

8. The method of claim 6, wherein the conductive polymer composite material layer includes a second nanometer material mixed with the conductive polymer material and the first nanometer material, the second nanometer material includes a plurality of second fully embedded nanometer structures completely enclosed by the conductive polymer material and a plurality of second partially exposed nanometer structures partially exposed from the conductive polymer material to contact the oxide layer or the carbon paste layer, and the conductive polymer composite material layer includes a dispersion agent mixed with the conductive polymer material, the first nanometer material and the second nanometer material, wherein the first nanometer material is made of carbon nanotubes, graphene, metal nanowires, oxide nanoparticles or metal nanoparticles, and the second nanometer material is made of carbon nanotubes, graphene, metal nanowires, oxide nanoparticles or metal nanoparticles.

9. The method of claim 6, wherein each first capacitor has a surrounding insulating layer disposed on an outer surface of the oxide insulation layer and around the outer surface of the oxide insulation layer, and the lengths of the conductive polymer composite material layer, the carbon paste layer, and the silver paste layer of the first capacitor are limited by the surrounding insulating layer, wherein the oxide insulation layer has a surrounding region formed on the outer surface thereof, and the surrounding insulating layer of the first capacitor is surroundingly disposed on the surrounding region of the oxide insulation layer for contacting an end of the conductive polymer composite material layer, an end of the carbon paste layer, and an end of the silver paste layer.

10. The method of claim 6, wherein the capacitor unit includes a plurality of second capacitors sequentially stacked on top of one another and electrically connected with each other, and each second capacitor has a second positive portion and a second negative portion, wherein the first capacitors are disposed on a top surface of the first embedded portion of the first conductive terminal, and the second capacitors are disposed on a bottom surface of the first embedded portion of the first conductive terminal.

11. A capacitor unit for increasing electrical performances, comprising at least one first capacitor, the at least one first capacitor includes a conductive polymer composite material layer, wherein the conductive polymer composite material layer includes a conductive polymer material and a first nanometer material mixed with the conductive polymer material, and the first nanometer material includes a plurality of first fully embedded nanometer structures completely enclosed by the conductive polymer material and a plurality of first partially exposed nanometer structures partially exposed from the conductive polymer material.

12. The capacitor unit of claim 11, wherein the at least one first capacitor is a chip-type solid electrolytic capacitor, a winding-type solid electrolytic capacitor or a tantalum solid electrolytic capacitor.

* * * * *